US012482994B2

(12) United States Patent
Post

(10) Patent No.: US 12,482,994 B2
(45) Date of Patent: Nov. 25, 2025

(54) REEL BASED OUTLET RELOCATION/EXTENSION SYSTEM

(71) Applicant: One-Eyed Pilot Innovations, Inc., Detroit, TX (US)

(72) Inventor: James Bradley Post, Detroit, TX (US)

(73) Assignee: One-Eyed Pilot Innovations, Inc., Detroit, TX (US)

( * ) Notice: Subject to any disclaimer, the term of this patent is extended or adjusted under 35 U.S.C. 154(b) by 0 days.

(21) Appl. No.: 18/457,195

(22) Filed: Aug. 28, 2023

(65) Prior Publication Data

US 2024/0128694 A1 Apr. 18, 2024

Related U.S. Application Data

(63) Continuation of application No. 17/200,062, filed on Mar. 12, 2021, now Pat. No. 11,742,622, which is a continuation of application No. 16/034,897, filed on Jul. 13, 2018, now Pat. No. 10,950,990.

(60) Provisional application No. 62/651,465, filed on Apr. 2, 2018.

(51) Int. Cl.

| | |
|---|---|
| ***H01R 13/72*** | (2006.01) |
| ***H01R 13/502*** | (2006.01) |
| ***H01R 13/70*** | (2006.01) |
| ***H01R 13/717*** | (2006.01) |
| ***H01R 25/00*** | (2006.01) |
| ***H01R 27/02*** | (2006.01) |
| ***H01R 43/18*** | (2006.01) |

(52) U.S. Cl.

CPC ........... *H01R 13/72* (2013.01); *H01R 25/006* (2013.01); *H01R 27/02* (2013.01); *H01R 43/18* (2013.01); *H01R 13/502* (2013.01); *H01R 13/701* (2013.01); *H01R 13/7175* (2013.01)

(58) Field of Classification Search

CPC .... H01R 13/72; H01R 13/502; H01R 13/701; H01R 13/7175; H01R 13/73; H01R 35/025; H01R 35/032; H01R 25/006; H01R 27/02; H01R 43/18

USPC ........ 439/502, 527, 538, 539, 574, 575, 528

See application file for complete search history.

(56) References Cited

U.S. PATENT DOCUMENTS 4,772,220 A * 9/1988 Hallier, Jr. ............. H01R 13/60 439/528
4,921,444 A * 5/1990 Cama ..................... H01R 13/60 439/528
4,946,010 A 8/1990 Dibono
(Continued)

OTHER PUBLICATIONS

US Office Action on U.S. Appl. No. 17/200,062 DTD Feb. 17, 2022.
(Continued)

*Primary Examiner* — Gary F Paumen
(74) *Attorney, Agent, or Firm* — Foley & Lardner LLP

(57) ABSTRACT

A power adapter kit may include a base wall mounted power adapter configured to be plugged into a wall power outlet and at least one extension adapter unit electrically coupled to the base wall mounted power adapter and configured to be extended away from the wall power outlet. The extension adapter unit(s) may include an electrical conduit reel configured to unravel in response to the extension adapter unit(s) being extended. At least one connecting mechanism may be configured to be mounted to a wall and engage corresponding extension adapter unit(s), thereby supporting the corresponding at least one extension adapter unit by the wall.

17 Claims, 21 Drawing Sheets

(56) References Cited

U.S. PATENT DOCUMENTS

| | | | | |
|---|---|---|---|---|
| 5,562,488 | A | 10/1996 | Neiser et al. | |
| 5,700,150 | A | 12/1997 | Morin | |
| 5,700,158 | A | 12/1997 | Neiser et al. | |
| 6,210,213 | B1 * | 4/2001 | Stekelenburg | A45F 5/02 439/37 |
| 7,223,122 | B2 * | 5/2007 | Mori | H01R 13/60 439/574 |
| 9,517,841 | B2 | 12/2016 | Ford | |
| 10,950,990 | B2 | 3/2021 | Post | |
| 11,742,622 | B2 * | 8/2023 | Post | H01R 27/02 439/502 |
| 2002/0123264 | A1 | 9/2002 | Neiser | |
| 2002/0142652 | A1 * | 10/2002 | Stekelenburg | H01R 13/5213 439/575 |
| 2006/0286861 | A1 | 12/2006 | Avevor et al. | |
| 2011/0215759 | A1 | 9/2011 | Lee et al. | |
| 2012/0320546 | A1 | 12/2012 | Wu | |
| 2016/0006189 | A1 | 1/2016 | Morehead | |
| 2016/0164325 | A1 | 6/2016 | Hinojosa et al. | |
| 2016/0226279 | A1 | 8/2016 | Anderson | |
| 2018/0212386 | A1 | 7/2018 | Nauertz | |

OTHER PUBLICATIONS

Final Office Action on U.S. Appl. No. 17/200,062 DTD Sep. 2, 2022.

Non-Final Office Action on U.S. Appl. No. 17/200,062 DTD Jan. 20, 2023.

Notice of Allowance on U.S. Appl. No. 17/200,062 DTD Apr. 4, 2023.

* cited by examiner

REEL BASED OUTLET RELOCATION/EXTENSION SYSTEM

CROSS-REFERENCE TO RELATED PATENT APPLICATIONS

This application is a continuation of U.S. patent application Ser. No. 17/200,062, filed Mar. 12, 2021, which is a continuation of U.S. patent application Ser. No. 16/034,897, filed Jul. 13, 2018, now U.S. Pat. No. 10,950,990, which claims priority to U.S. Provisional Patent Application No. 62/651,465, filed Apr. 2, 2018, each of which is incorporated by reference herein in its entirety.

FIELD OF THE INVENTION

The present invention relates to electrical outlets, and more specifically, to relocatable and extendable electrical outlets.

BACKGROUND OF THE INVENTION

Electrical outlets are one of the most components in a home because most of our lives revolve around the ability to supply power to our tools, games, and other electronic items. However, for aesthetic and safety purposes there is a limit to the quantity and density of outlets with commercial and residential buildings. As a result, access to electrical outlets is difficult and tethers our lives to certain locations in the building.

Electrical extensions have attempted to expand our travel beyond the length of our power cords. Electrical extensions bring their own access issues as they constantly fall into inaccessible locations, force us to search in tight locations for the end of the extension, limit the number of devices that can benefit from the extension, and limit the direction from the electrical outlet that we experience the freedom to the single direction that the electrical extension is run.

BRIEF SUMMARY OF THE INVENTION

One embodiment of a power adapter may include a base wall mounted power adapter configured to be plugged into a wall power outlet and at least one extension adapter unit electrically coupled to the base wall mounted power adapter and configured to be extended away from the wall power outlet. The at least one extension adapter unit may include an electrical conduit reel configured to unravel in response to the at least one extension adapter unit being extended.

One embodiment of a method of manufacturing a wall mounted power adapter, may include forming a first housing unit. A first electrical conduit may be included within the first housing unit. A second housing unit may be formed. An electrical conduit reel with a second electrical conduit supported thereby may be attached within the second housing unit, where the electrical conduit reel may enable the second electrical conduit to spool therefrom and outside the second housing unit. An outlet may be mechanically coupled to the second housing unit. A first end of the second electrical conduit may be electrically coupled to the first electrical conduit, and a second end of the second electrical conduit may be may be electrically coupled to the outlet coupled to the second housing.

One embodiment of a method of manufacturing a wall mounted power adapter may include forming a first housing unit and a second housing unit, inserting an electrical conduit reel into the second housing unit, electrically coupling a first end of the electrical conduit reel to the first housing and electrically coupling a second end of the electrical conduit reel to the second housing, and recessing a portion of the second housing unit configured to receive a connecting mechanism for connecting the second housing unit to wall.

One embodiment of a power adapter may include a base wall mounted power adapter and at least one extension adapter unit. The base wall mounted power adapter may include a first electrical conductor, an electrical plug electrically coupled to the first electrical conductor and configured to be plugged into a wall power outlet, and a first housing configured to house the first electrical conductor and support said electrical plug. The least one extension adapter unit may include a second electrical conductor electrically coupled to the first electrical conductor, an extension adapter socket configured to enable electrical plugs to be electrically connected thereto, an electrical conduit reel configured to circularly support the second electrical conductor, and enable the second electrical conductor to unravel from a first state to a second state in response to the at least one extension adapter unit being pulled away from the base wall mounted power adapter, and a second housing configured (i) to house the second electrical conductor and the electrical conduit reel, and (ii) to support the extension adapter socket.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
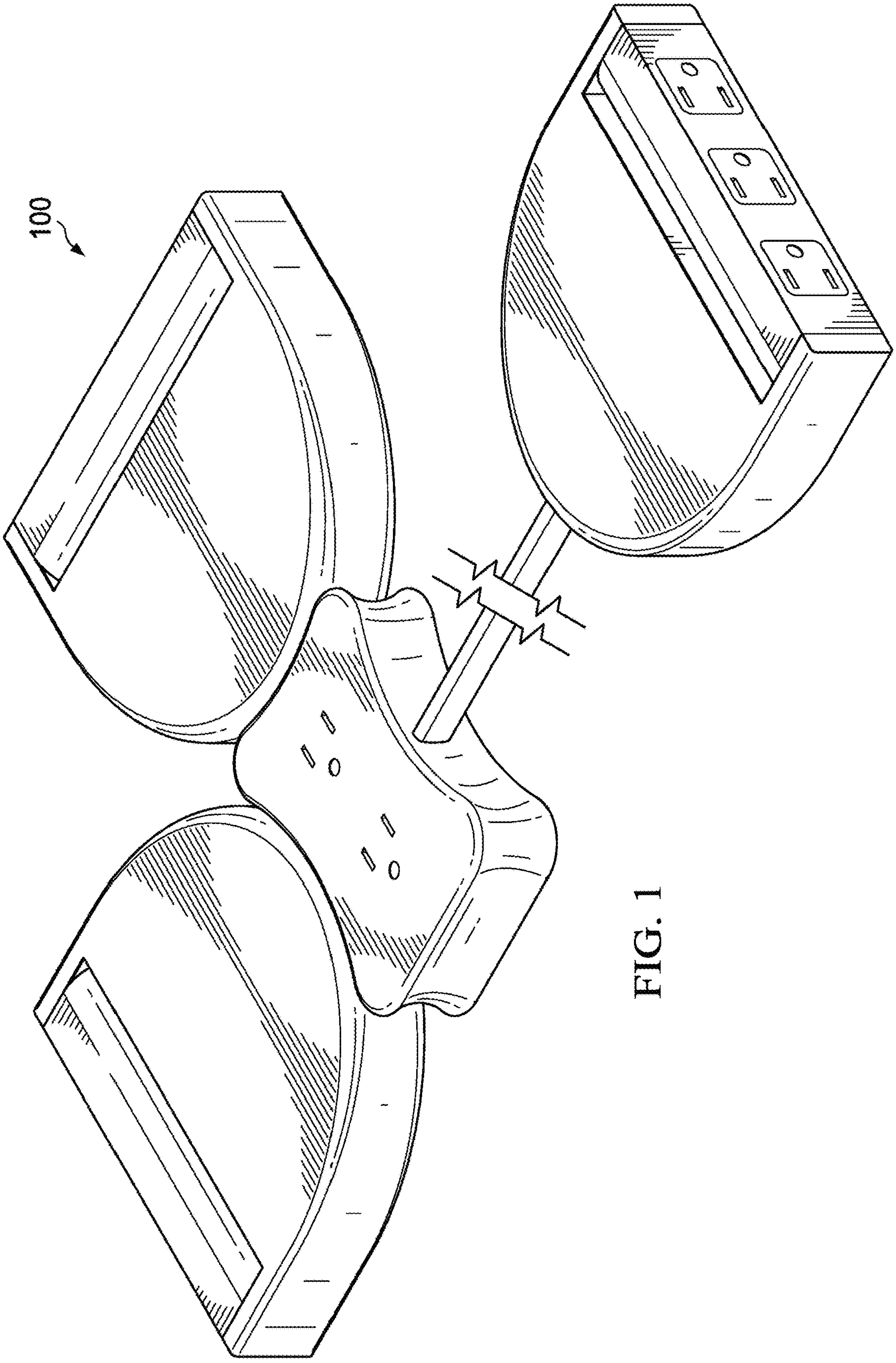
FIG. 1 is an illustration of an illustrative model of a relocatable/extendable power adapter.

With regard to FIG. 1, an illustration of an illustrative model of a relocatable/extendable power adapter 100 is shown. The power adapter 100 may be used for distributing electrical power to locations extended and/or relocated from an electrical outlet affixed to a wall in a building.

The power adapter 100 may be plugged into the electrical outlet and detachably coupled to alternative positions on the wall, or different walls. The power adapter may be configured to provide electrical power from the electrical outlet in the wall to a plurality of electronic devices at both the electrical outlet and the alternative positions. The power adapter 100 may be configured to include a housing with a profile that may be placed behind objects in the building.

Figure 2:
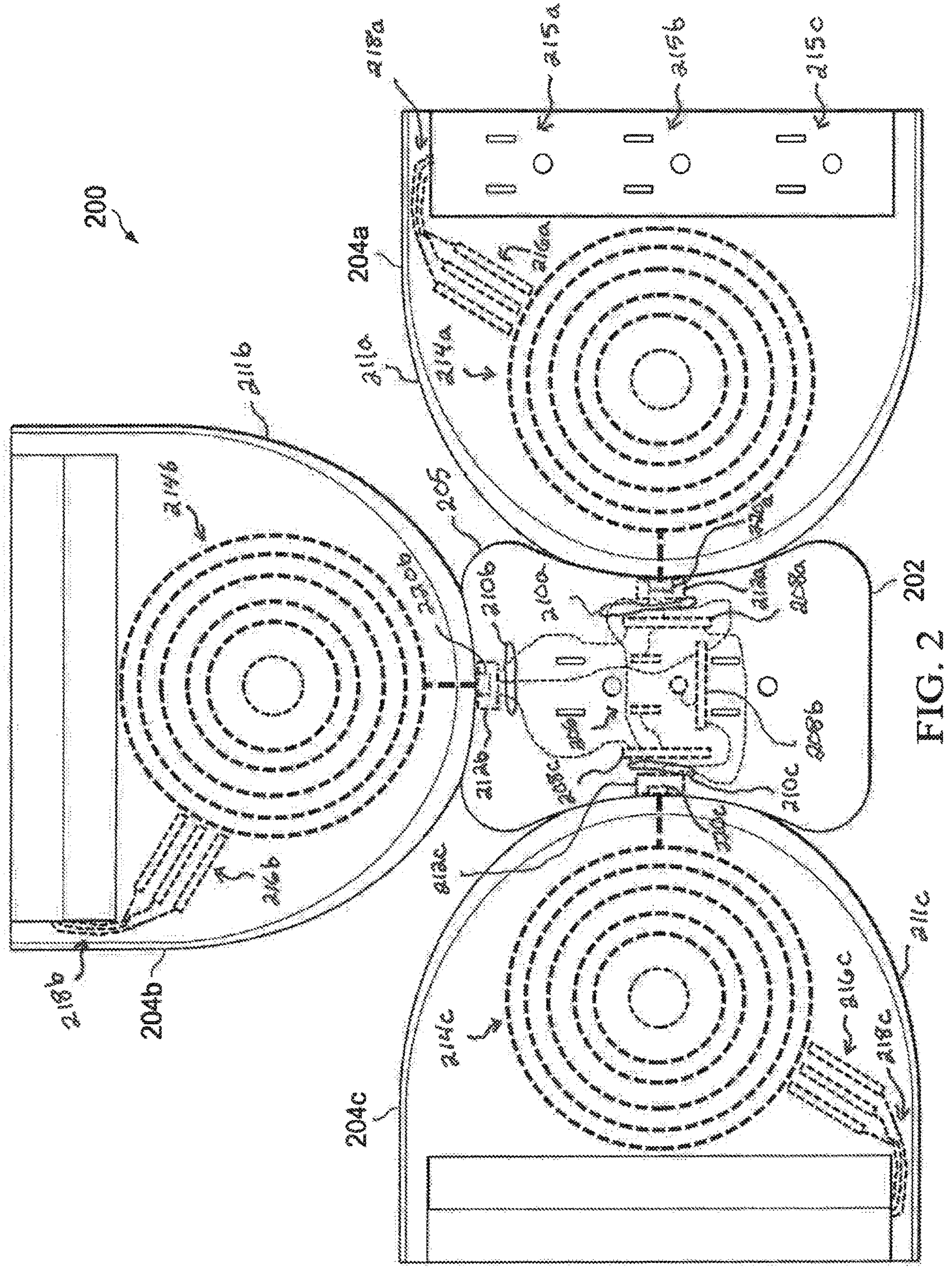
FIG. 2 is an illustration of an illustrative drawing of a relocatable/extendable power adapter.

With regard to FIG. 2, an illustration of an illustrative drawing of a relocatable/extendable power adapter 200 is shown. The power adapter 200 may include a base wall mounted power adapter 202 and at least one extension adapter unit 204*a*-204*c* (collectively 204).

The base wall mounted power adapter 202 may include a first housing, at least one first electrical conductor, and at least one electrical plug electrically coupled to said at least one first electrical conductor. The at least one electrical plug may be configured to be plugged into the wall electrical outlet. The housing may be configured to house the at least one first electrical conductor and support the electrical plug.

The at least one extension adapter unit 204 may include a second housing, at least one second electrical conductor, an extension adapter socket, and an electrical conduit reel. The at least one second electrical conductor may be electrically coupled to the at least one first electrical conductor. The extension adapter socket may be configured to enable electrical plugs to be electronically connected thereto. The second housing may be configured to house the at least one second electrical conductor and the electrical conduit reel. The second housing may be further configured to support the extension adapter socket.

Figure 3:
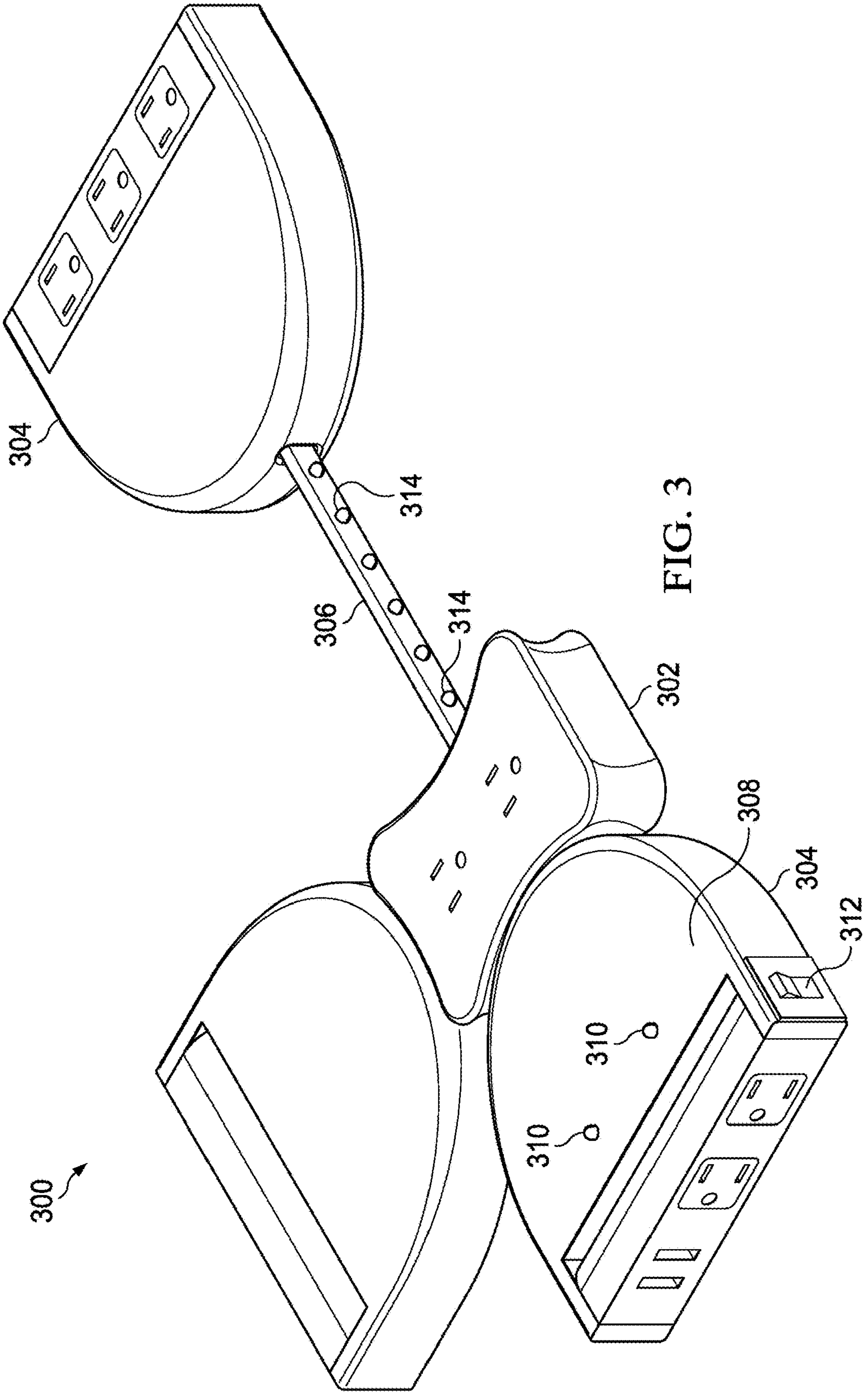
FIG. 3 is an illustration of an illustrative drawing of a relocatable/extendable power adapter.

With regard to FIG. 3, an illustration of an illustrative drawing of a relocatable/extendable power adapter 300 is shown. The power adapter 300 may include a base wall mounted power adapter 302 and at least one extension adapter unit 304. In an embodiment, one or more of the extension adapter units 304 may have a handle or ridge that may enable a user to more easily grip the extension adapter unit(s) 304 when extending the unit(s) 304 from the base wall mounted power adapter 302.

The at least one extension adapter unit 304 may include an electrical conductor 306 and an electrical conduit reel (as described hereinbelow with reference to FIGS. 13-17C). The electrical conduit reel may be configured to circularly support the electrical conductor 306. The electrical conduit reel may be further configured to enable the electrical conductor 306 to unravel from a first state to a second state in response to the extension adapter unit 304 being pulled away from the base wall mounted power adapter 302. The electrical conductor 306 may be fixedly attached (e.g., soldered, connected to an electrical block, or otherwise attached) within the base wall mounted power adapter 302. In an alternative embodiment, the electrical conductor 306 may have an electrical connector (e.g., plug) that may connect into a mating electrical connector (e.g., socket), as understood in the art, on the base wall mounted power adapter 302 and/or the extension adapter unit 304, thereby allowing for extension adapter unit(s) 304 to be acquired separate from the adapter 302 and added after installation of the adapter 302.

In an embodiment, a portion or all of the housing 308 of one or more components of the power adapter 300 may be transparent (e.g., clear plastic), translucent (e.g., semi-clear plastic in any color or multiple colors), or opaque (e.g., solid white). In an embodiment, one or more of the extension adapter units 304 extending from a base wall mounted power adapter 302 may have at least a portion of the housing being translucent. In another embodiment, one or more illumination devices 310, such as light emitting diodes (LEDs) mounted to and powered by one or more of the extension adapter unit, may be configured to illuminate when power is available thereat. The illumination device may be positioned within the housing such that when illuminated, a clear or translucent housing allows for the illumination to pass therethrough. In an alternative embodiment, the illumination device may be positioned on an outside portion of the housing. In an embodiment, a current sensor may be configured to illuminate the illumination device in response to a device being plugged into the extension adapter unit. In another embodiment, a switch 312 may be positioned on any of the components of the power adapter 300, and be configured to enable a user to turn on or off the illumination device, thereby acting as a nightlight. In yet another embodiment, a light sensor may be configured to sense when ambient light is below a certain level, and cause the illumination device to turn on, and in response to sensing when the ambient light is above a certain level, to turn off the ambient light.

If the device is a rechargeable device, such as a rechargeable battery of a mobile phone, then the illumination device may be configured to generated different colors (e.g., blue, white, green, yellow) depending on whether the rechargeable device is powered or not (e.g., if current is flowing or not). In such a configuration, the socket may be a conventional adapter, such as a USB port, as understood in the art, that is capable of causing the illumination device to be illuminated. In another embodiment, the electrical conductor 306 that extends between the base power adapter and extension adapter unit may include one or more illumination devices 314, such as LEDs, that are configured to operate in the same or similar manner as the illumination device positioned on the extension adapter unit.

In an embodiment, an extra extension unit that may or may not have outlets, and may serve to increase the overall distance the extendable unit could reach may be utilized. The extra extension unit may essentially operate as an extension cord that allows for additional distance (e.g., 6-10 feet) of the extension adapter unit 304. The extra extension unit may include an adapter configured to enable the electrical conductor 306 to connect thereto, if disconnectable from the extension adapter unit 304 or base wall mounted power adapter 302. In an embodiment, instead of connecting to the power adapter 302, the extendable unit could connect to another accessory, which may also mount to the wall.

Alternatively, the extension unit may connect to the hub. The extendable unit may include a pair of adapters, one on each end of an electrical conductor. In an embodiment, the electrical conductor may be contained within a housing and spooled outward from each end, thereby allowing for a consistent look with the extension adapter unit 304 and power adapter 302.

Figure 4A:
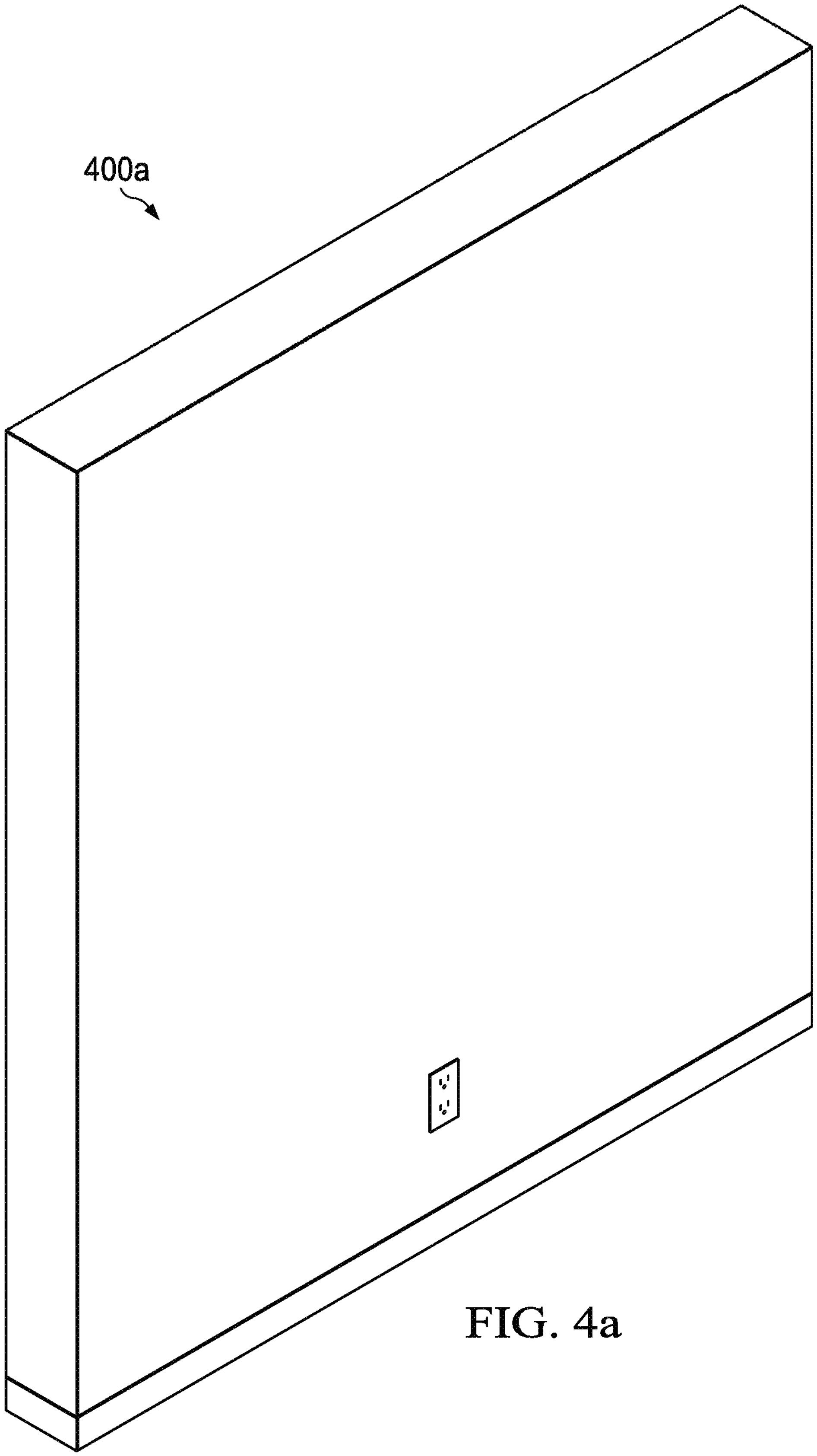
FIGS. 4A-4C are illustrations of an illustrative drawing of a relocatable/extendable power adapter system behind an object in a room.
Figure 4B:
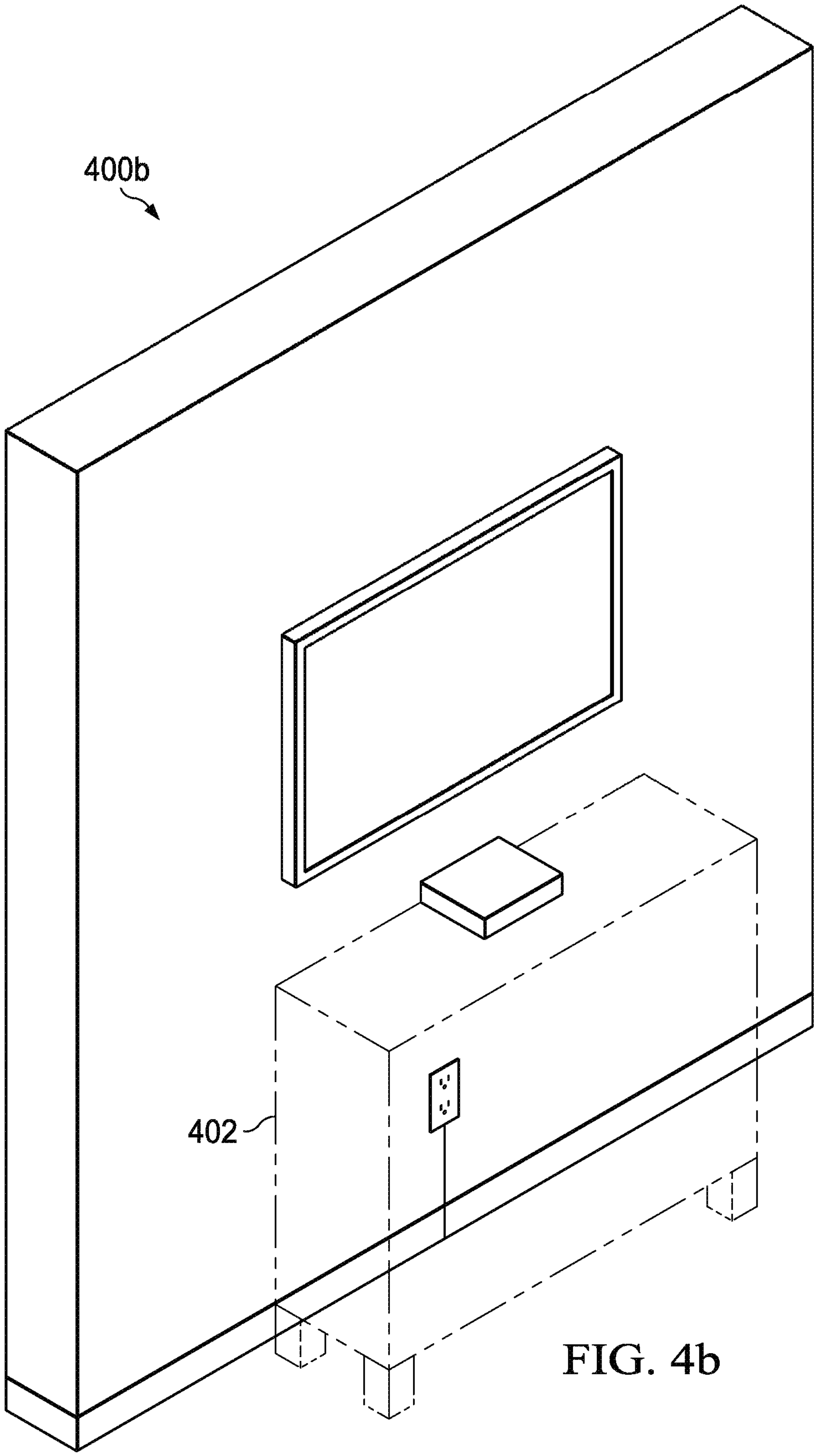
Figure 4C:
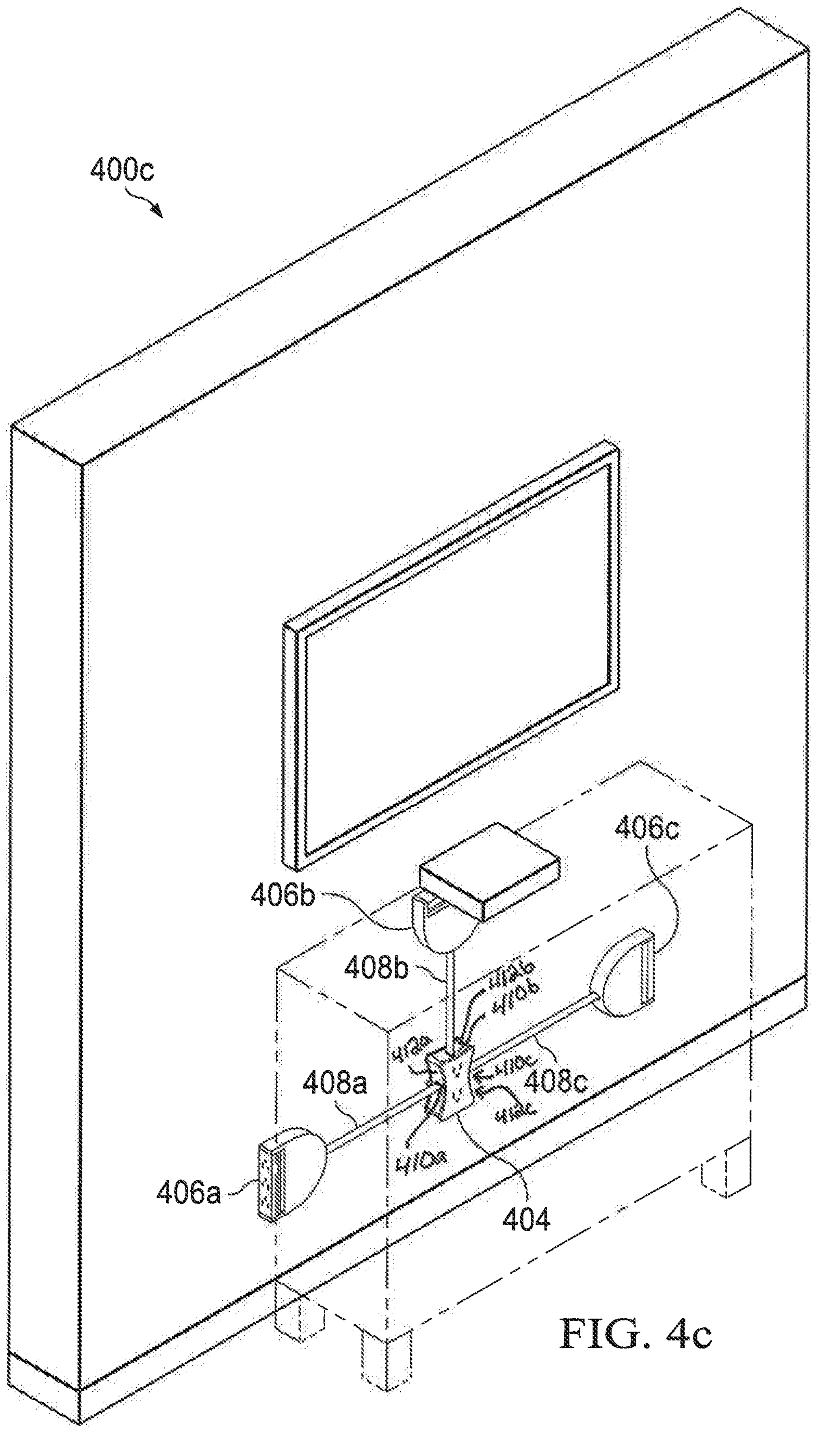

With regard to FIGS. 4A-4C, illustrations of an illustrative drawing of a relocatable/extendable power adapter system in a room 400*a*-400*c* (collectively 400) and behind an object 402 are shown. The power adapter system may include a base wall mounted power adapter 404 and at least one extension adapter unit 406*a*-406*c* (collectively 406).

The at least one extension adapter unit 406 may be electrically coupled to the base wall mounted power adapter 404 by an electrical conductor 408*a*-408*c* (collectively 408). The electrical conductor 408 may be the electrical conductor 306 of FIG. 3 as described hereinabove. The at least one extension adapter unit 406 may be enable a user to pull and mount the at least one extension adapter unit 406 so that it is more easily accessed behind the object 402. In one embodiment, the at least one extension adapter unit 406 may be configured to be mounted behind an edge of the object 402 so the user does not have to reach behind the object 402 to access an electrical outlet located at the base wall mounted power adapter 404.

Figure 5:
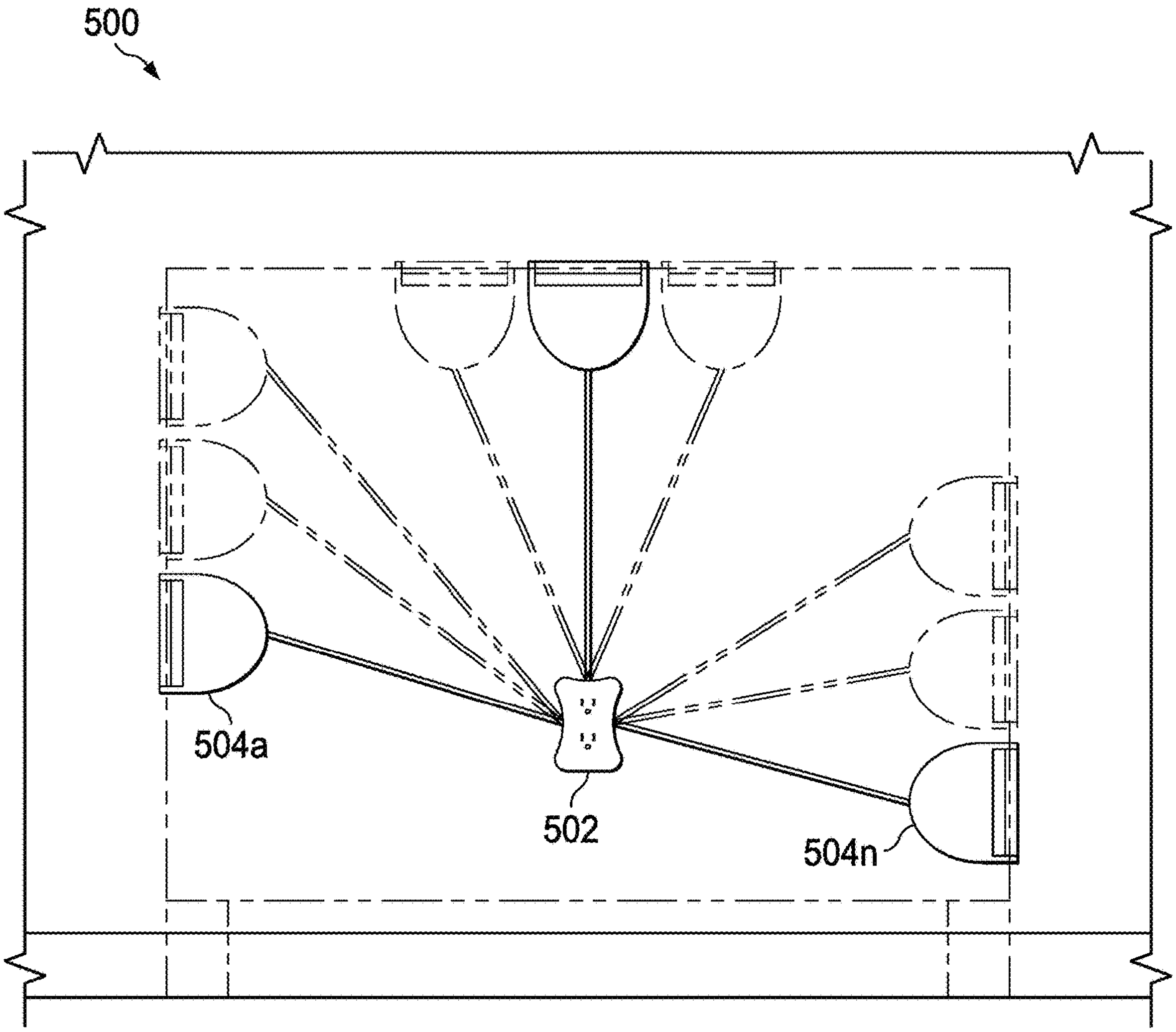
FIG. 5 is an illustration of an illustrative drawing of a maneuverability of a relocatable/extendable power adapter.

With regard to FIG. 5, an illustration of an illustrative drawing of a maneuverability of a relocatable/extendable power adapter 500 is shown. The power adapter 500 may include a base wall mounted power adapter 502 and at least one extension adapter unit 504*a*-504*n* (collectively 504).

The at least one extension adapter unit 504 may be configured to be pulled in a plurality of directions and/or distances away from the base wall mounted power adapter 502 so that a user may place the at least one extension adapter unit 504 in a location that is easily accessible by the user.

Figure 6:
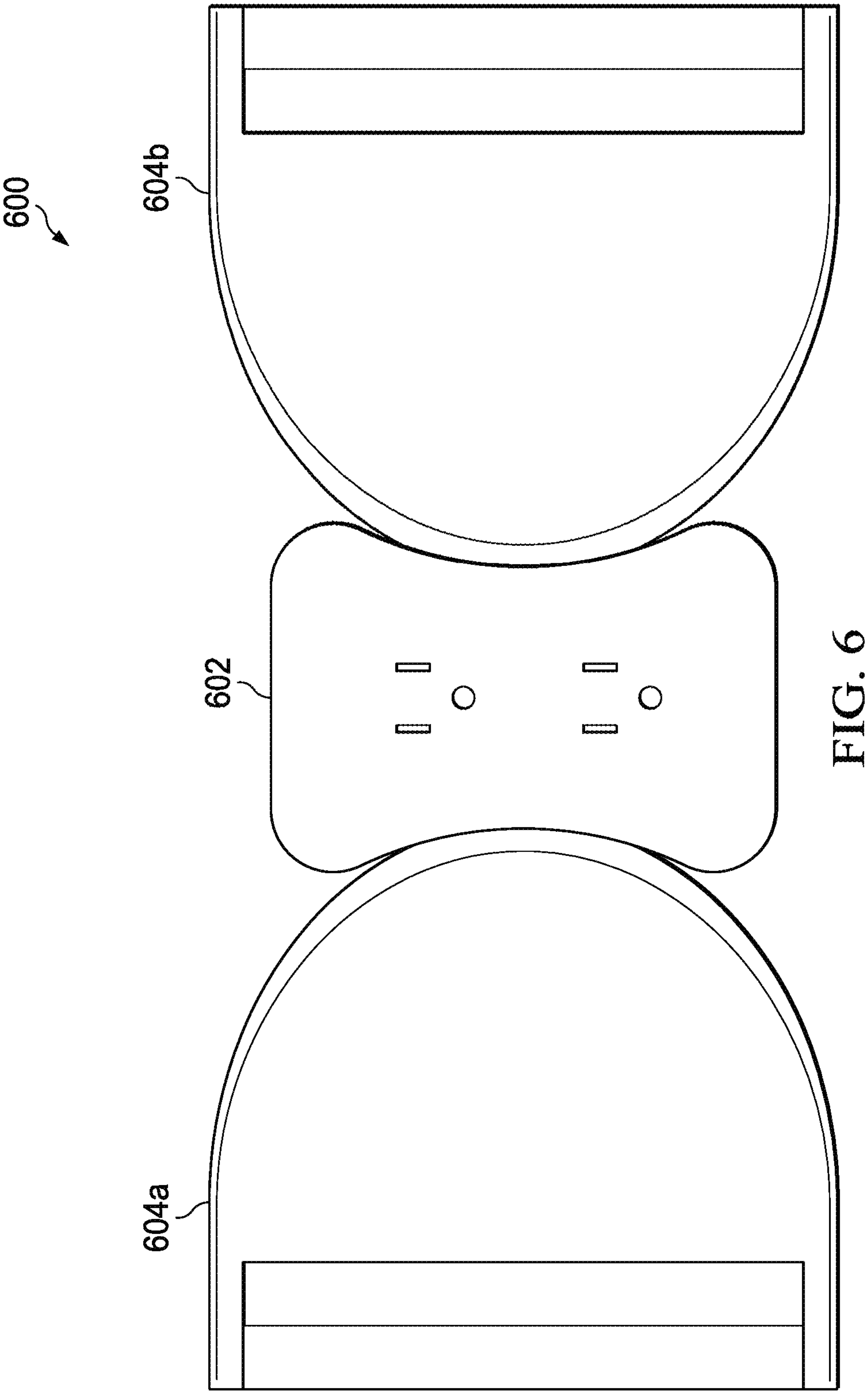
FIG. 6 is an illustration of an illustrative drawing of a relocatable/extendable power adapter.

With regard to FIG. 6, an illustration of an illustrative drawing of a relocatable/extendable power adapter 600 is shown. The power adapter 600 may include a base wall mounted power adapter 602 and at least one extension adapter unit 604*a* and 604*b* (collectively 604).

In one embodiment, the at least one extension adapter unit 604 may include two extension adapter units. In one embodiment, the at least one extension adapter unit 604 may include three extension adapter units as shown hereinabove with regard to FIGS. 1-5.

Figure 7:
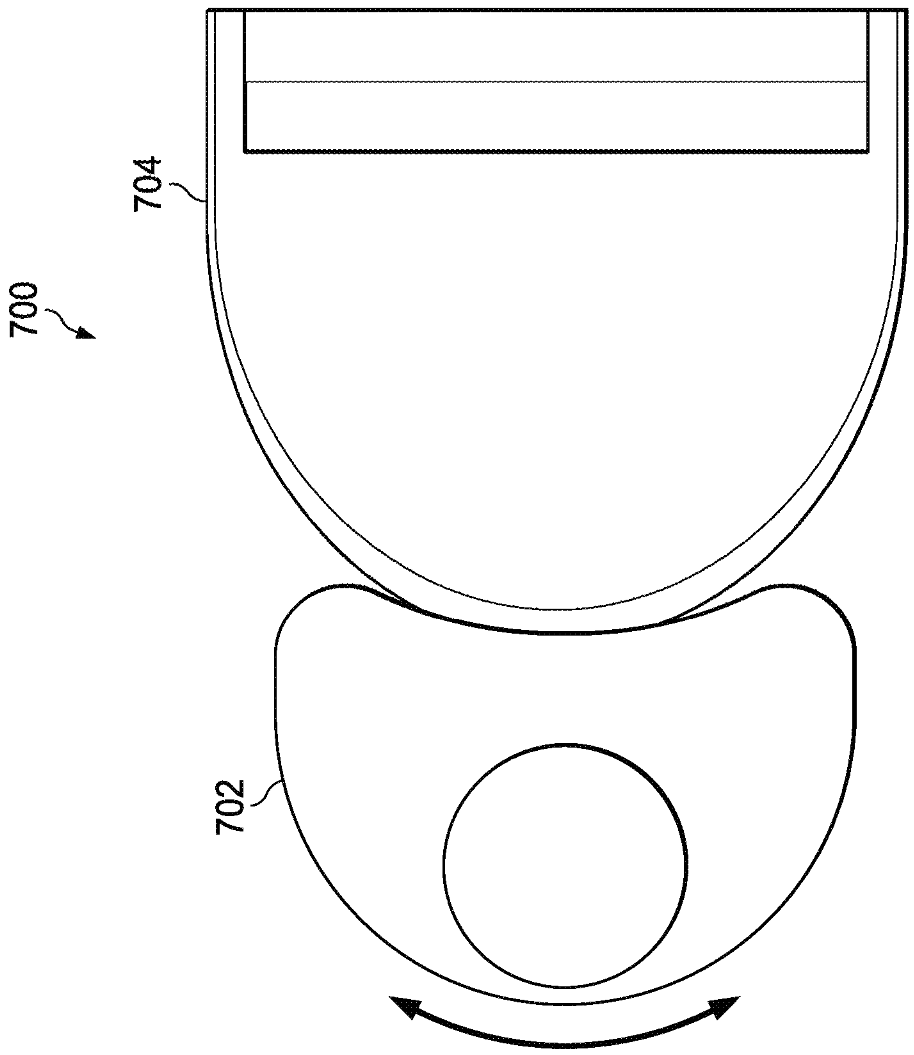
FIG. 7 is an illustration of an illustrative drawing of a relocatable/extendable power adapter.

With regard to FIG. 7, an illustration of an illustrative drawing of a relocatable/extendable power adapter 700 is shown. The power adapter 700 may include a base wall mounted power adapter 702 and an extension adapter unit 704. In one embodiment, the power adapter 700 may include one extension adapter unit 704.

Figure 8:
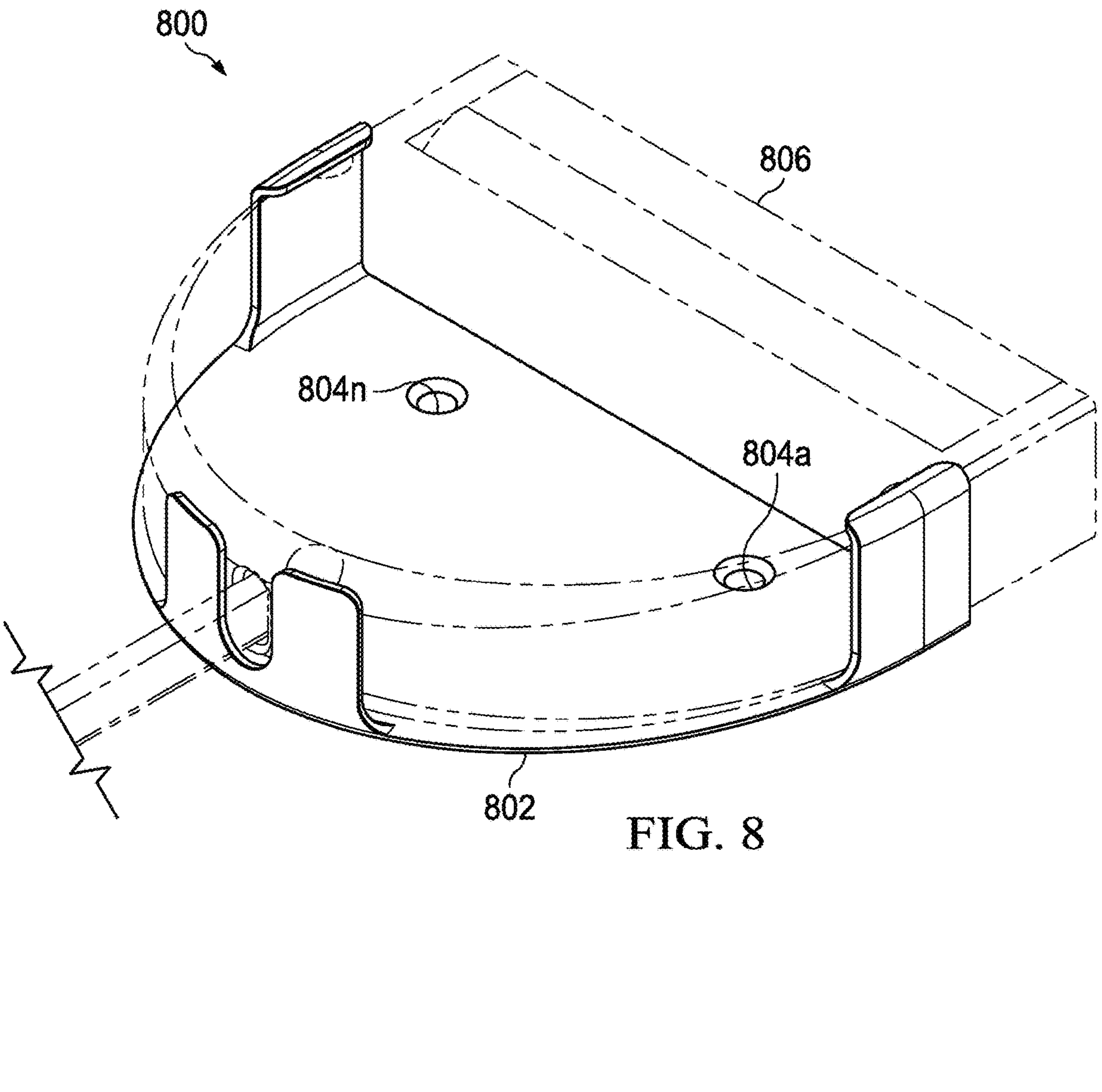
FIG. 8 is an illustration of an illustrative drawing of a connecting mechanism of an extended portion of a relocatable/extendable power adapter.

With regard to FIG. 8, an illustration of an illustrative drawing of a connecting mechanism 800 of an extended portion of a relocatable/extendable power adapter is shown. The connecting mechanism 800 may include a base 802 at least one opening 804*a*-804*n* (collectively 804) through the base 802 for a connecting device, such as a screw, to pass through to mount the connecting mechanism 800 to a wall. The connecting mechanism 800 may be configured to hold an extension adapter unit 806 in place using a bracket, latch, or otherwise. In one embodiment, the extension adapter unit 806 may be slid into the connecting mechanism 800.

Figure 9A:
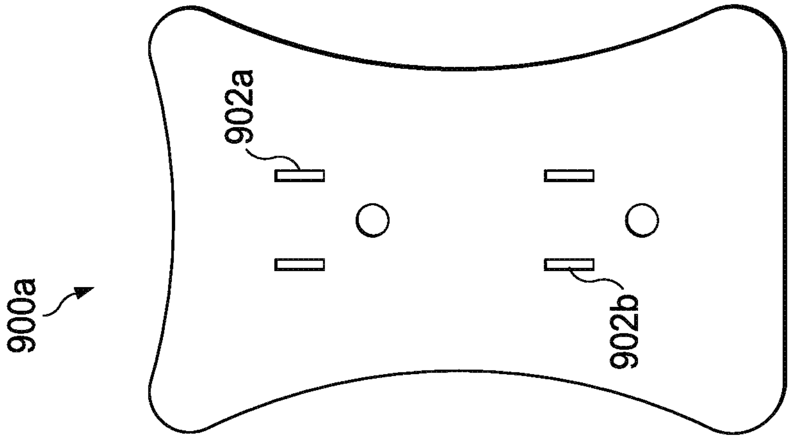
FIGS. 9A-9C are illustrations of an illustrative drawing of a base unit of a relocatable/extendable power adapter.
Figure 9B:
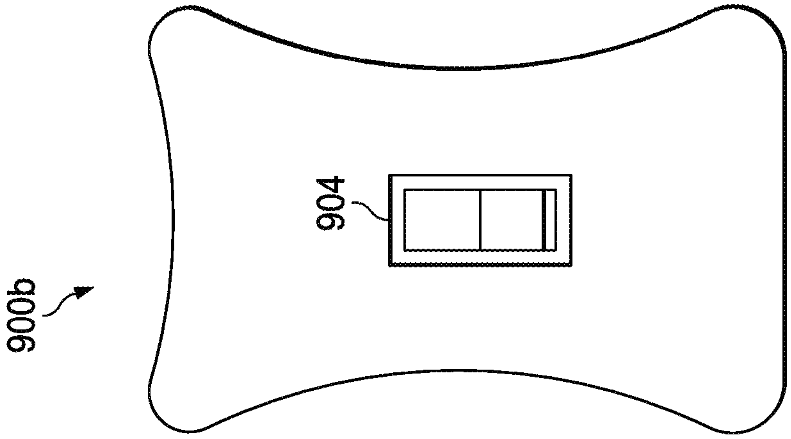
Figure 9C:
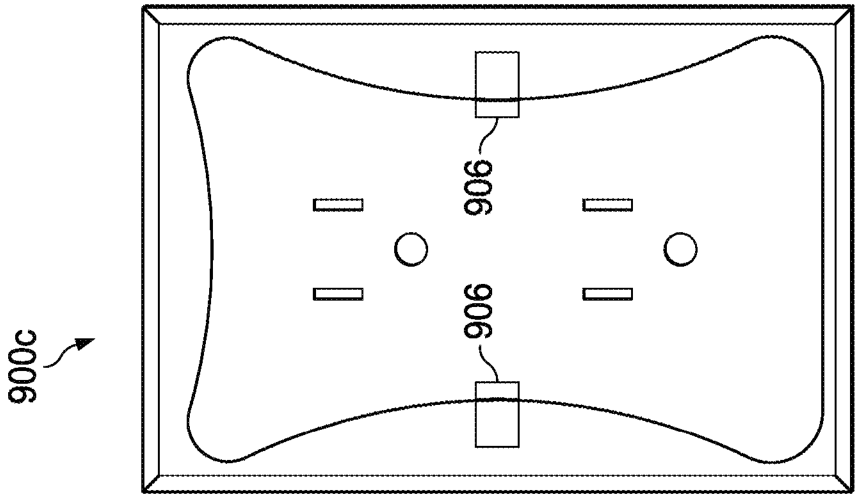

With regard to FIGS. 9A-9C, illustrations of an illustrative drawing of a base unit 900*a*-900*c* (collectively 900) of a relocatable/extendable power adapter are shown. In one embodiment, the base unit 900 may include at least one electrical socket 902*a* and 902*b* (collectively 902). In one embodiment, the base unit 900 may include a switch 904, such as, but not limited to, a light switch. The base unit 900 including the switch 904 may be mounted as a replacement unit inside a wall. In one embodiment, the base unit 900 may include a retractable unit that is held down by at least one latch 906, such as base unit 900*c*. The retractable unit may be configured to be installed within the wall. A user may pull out the retractable unit and attach at least one extension units. In one embodiment, the power adapter may be configured to be at least one of pre-assembled or modular so that the user may add and take away extension units as needed. One of skill in the art will appreciate that any of a plurality of sockets and/or outlets used to power and/or communicate with electrical devices, or any combination thereof, may be included in the base unit 900.

Figure 10A:
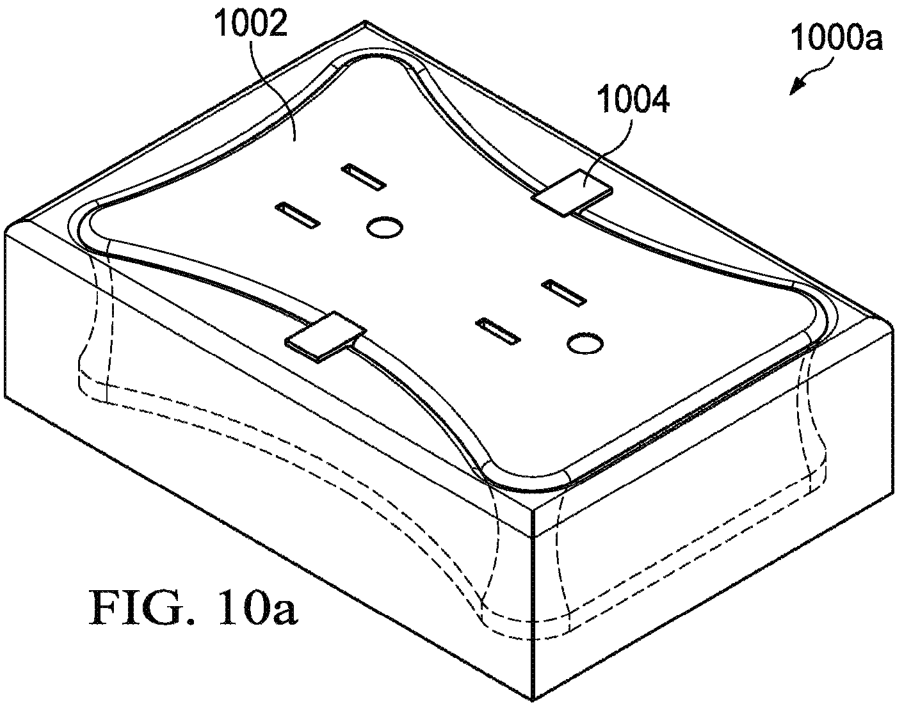
FIGS. 10A and 10B are illustrations of an illustrative drawing of a base unit of a relocatable/extendable power adapter.
Figure 10B:
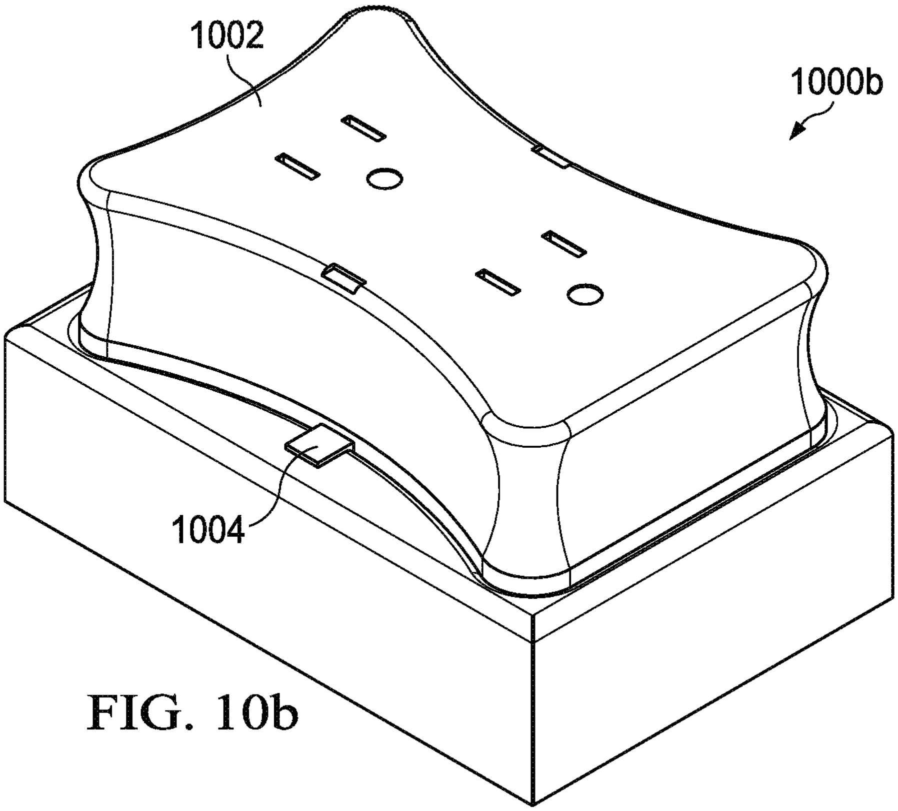

With regard to FIGS. 10A and 10B, illustrations of an illustrative drawing of a base unit 1000*a* and 1000*b* (collectively 1000) of a relocatable/extendable power adapter are shown. The base unit 1000 may be the base unit 900*c* of FIG. 9*c*. The base unit 1000 may include a retractable unit 1002 and at least one latch 1004 configured to hold the retractable unit 1002 in a first positon within the base unit 1002. A user may enable the retractable unit 1002 to extend to a second position so that it may be used with at least one modular extension unit.

Figure 11A:
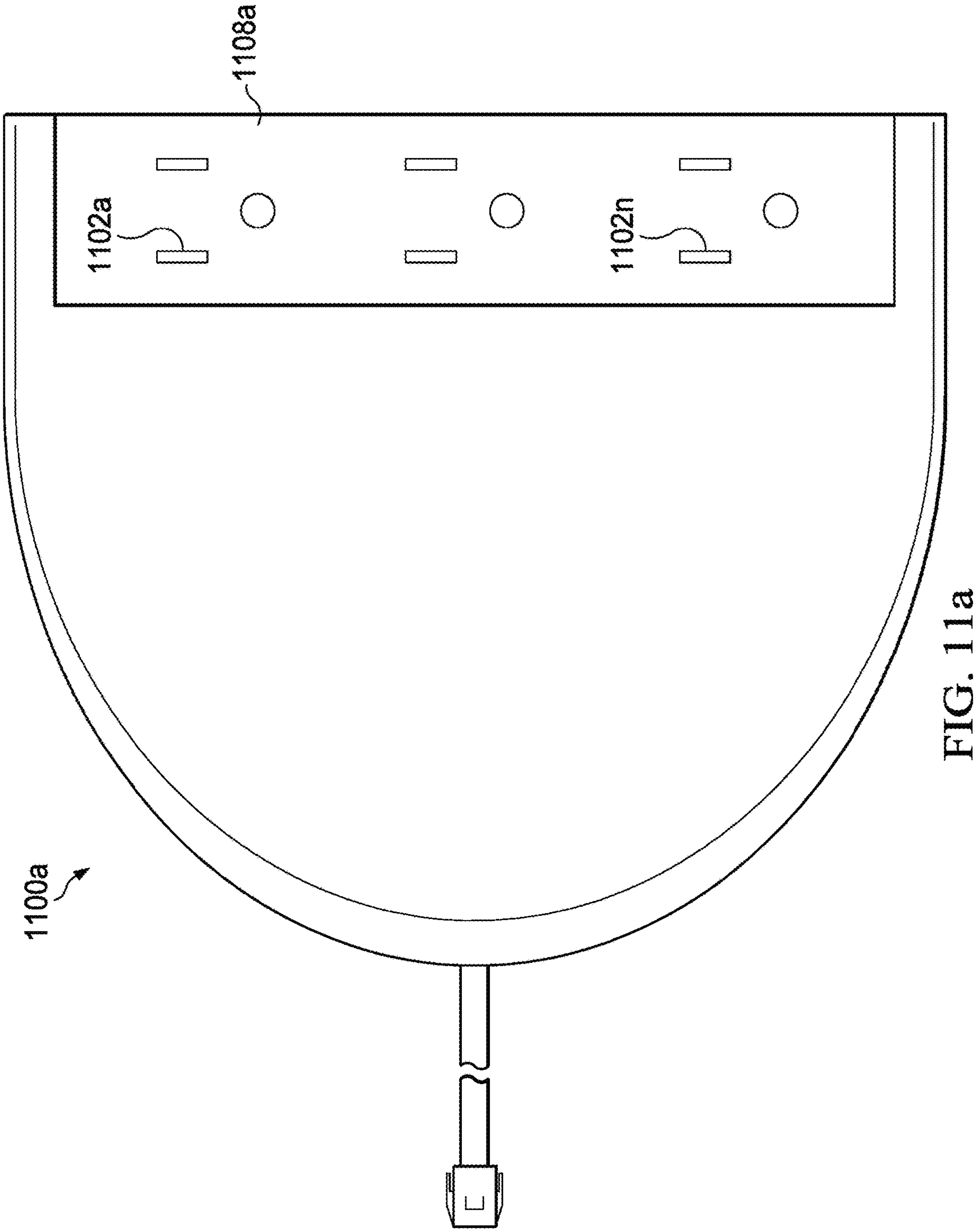
FIGS. 11A-11C are illustrations of an illustrative drawing of an extended unit of a relocatable/extendable power adapter.
Figure 11B:
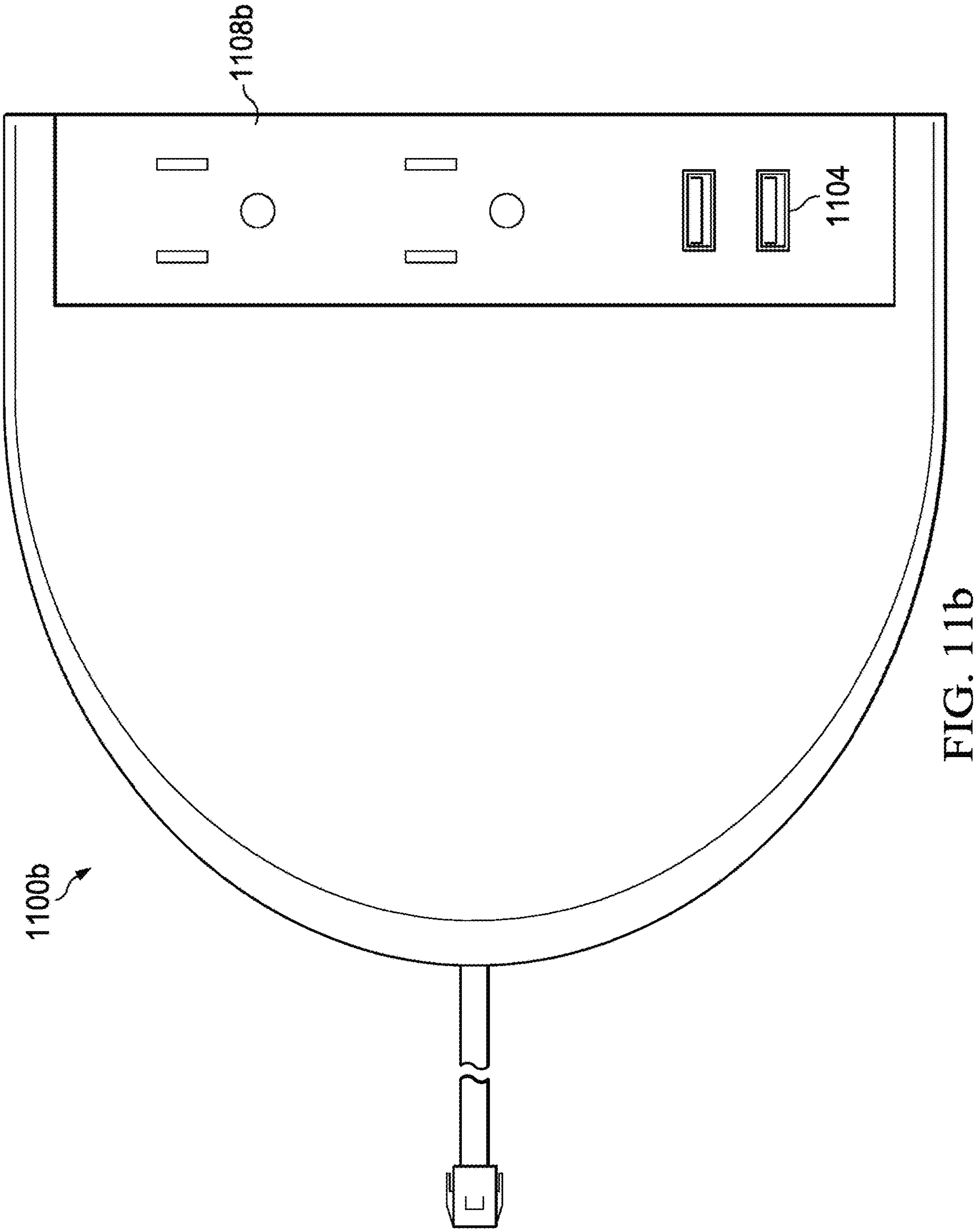
Figure 11C:
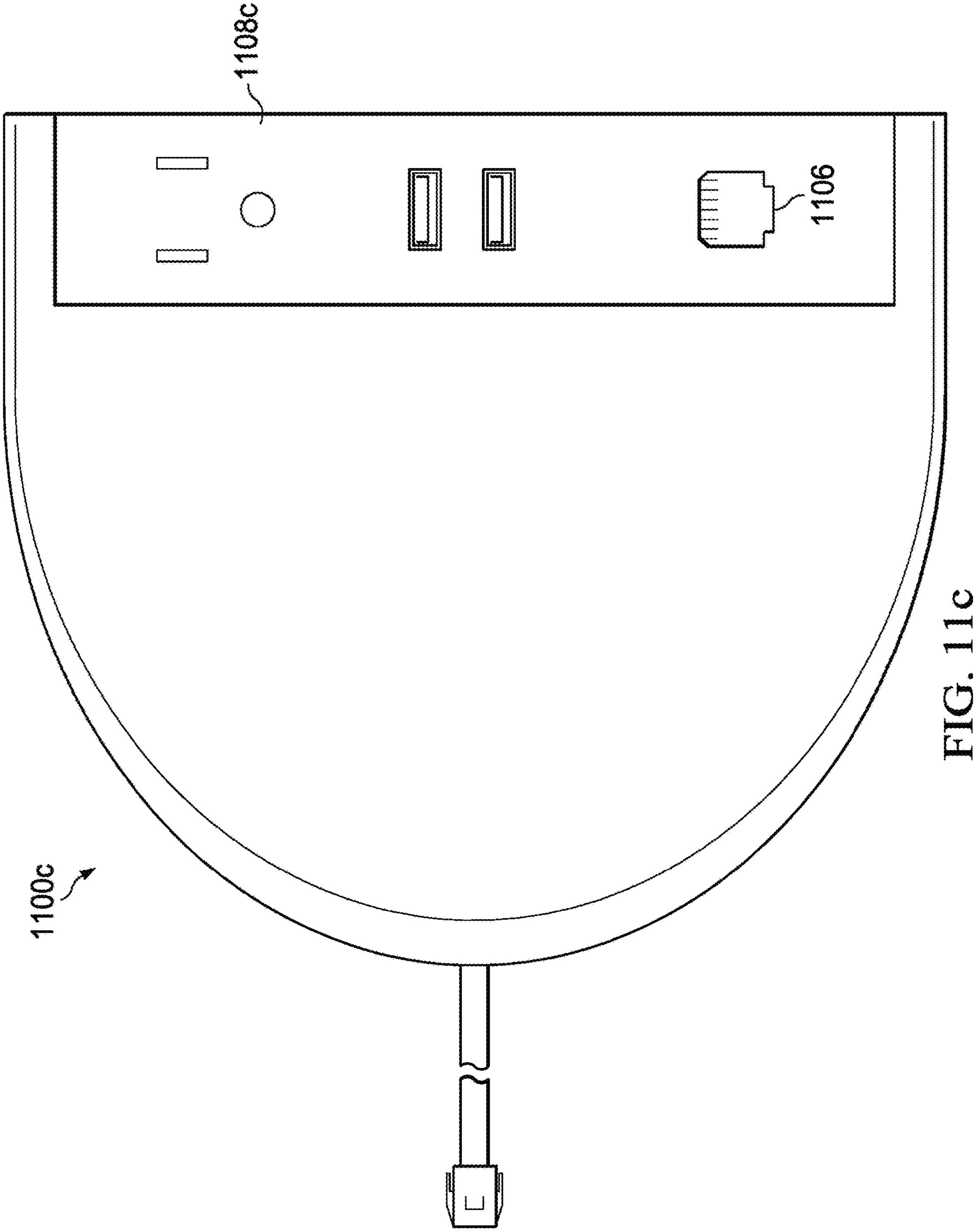

With regard to FIGS. 11A-11C, illustrations of an illustrative drawing of an extended unit 1100*a*-1100*c* (collectively 1100) of a relocatable/extendable power adapter are shown. The extended unit 1100 may include at least one of an electrical socket 1102*a*-1102*n* (collectively 1102), a universal serial bus (USB) port 1104, and an Ethernet port 1106.

In one embodiment, the extended unit 1100 may also include a rotatable member 1108*a*-1108*c* (collectively 1108) configured to house at least one of the at least one electrical socket 1102, the USB port 1104, and the Ethernet port 1106. The rotatable member 1108 may enable a user to rotate the rotatable member 1108 so that the user may access the extended unit in any of a plurality of positions and/or orientations. One of skill in the art will appreciate that any of a plurality of sockets and/or outlets used to power and/or communicate with electrical devices, or any combination thereof, may be included in the extended unit 1100. In one embodiment, the Ethernet port 1106 may be configured to provide power.

Figure 12A:
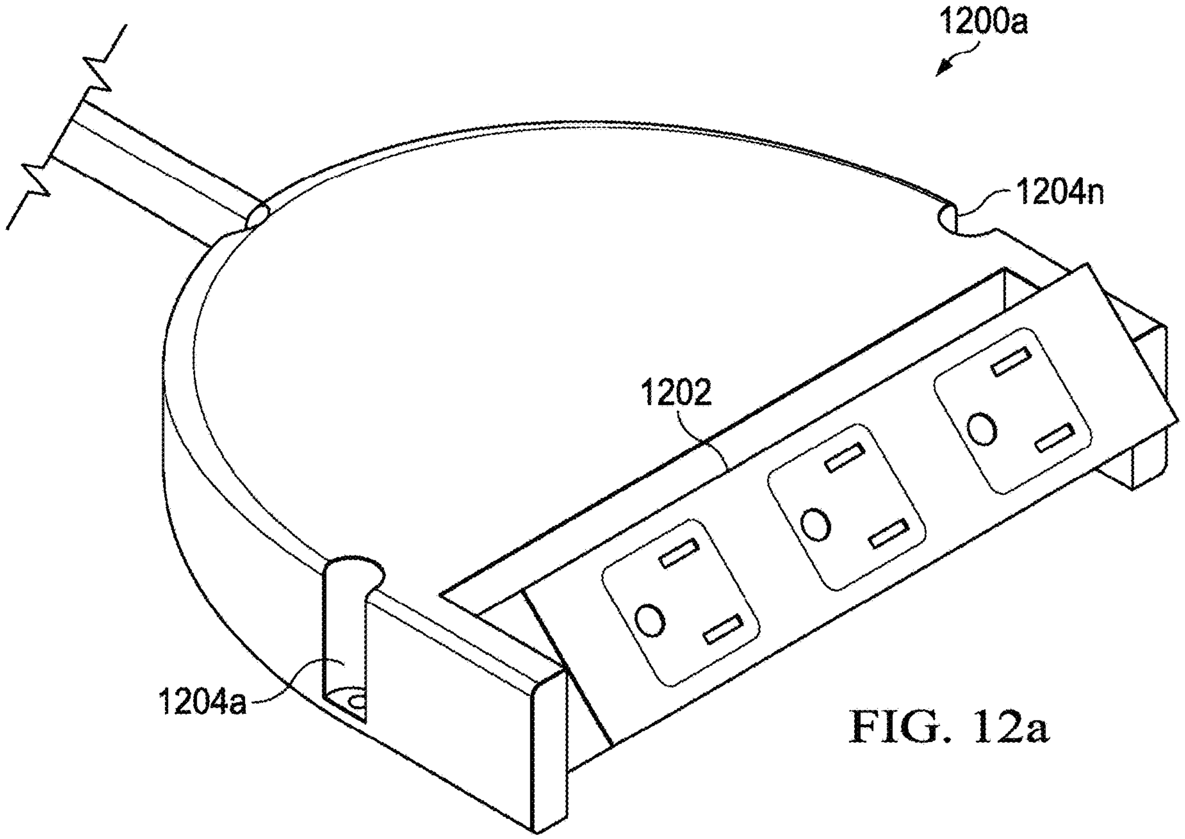
FIGS. 12A and 12B are illustrations of an illustrative drawing of a connecting mechanism of an extended portion of a relocatable/extendable power adapter.
Figure 12B:
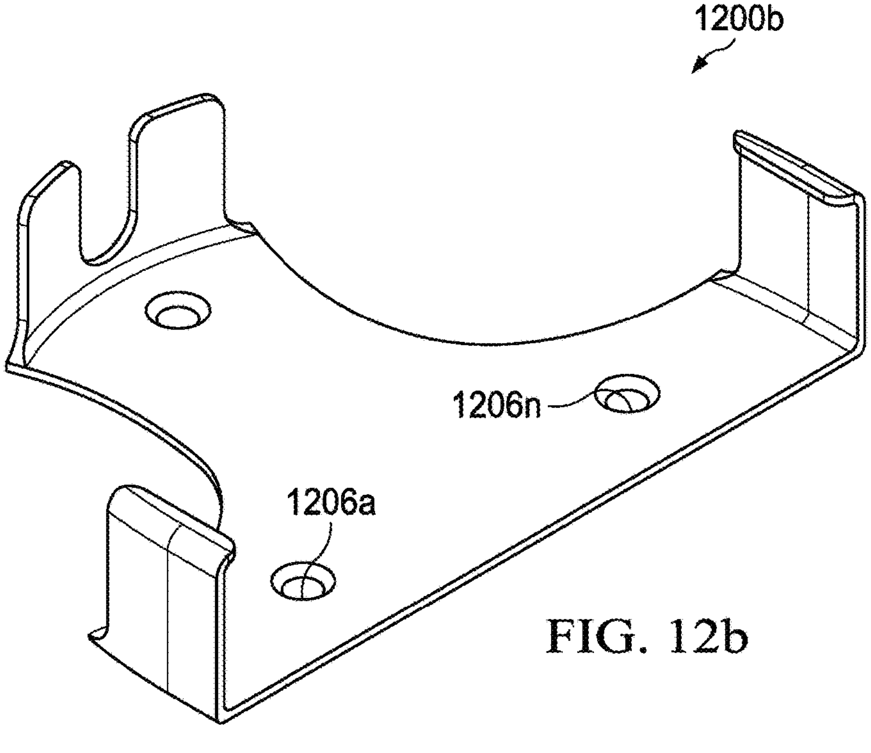
Figure 13:
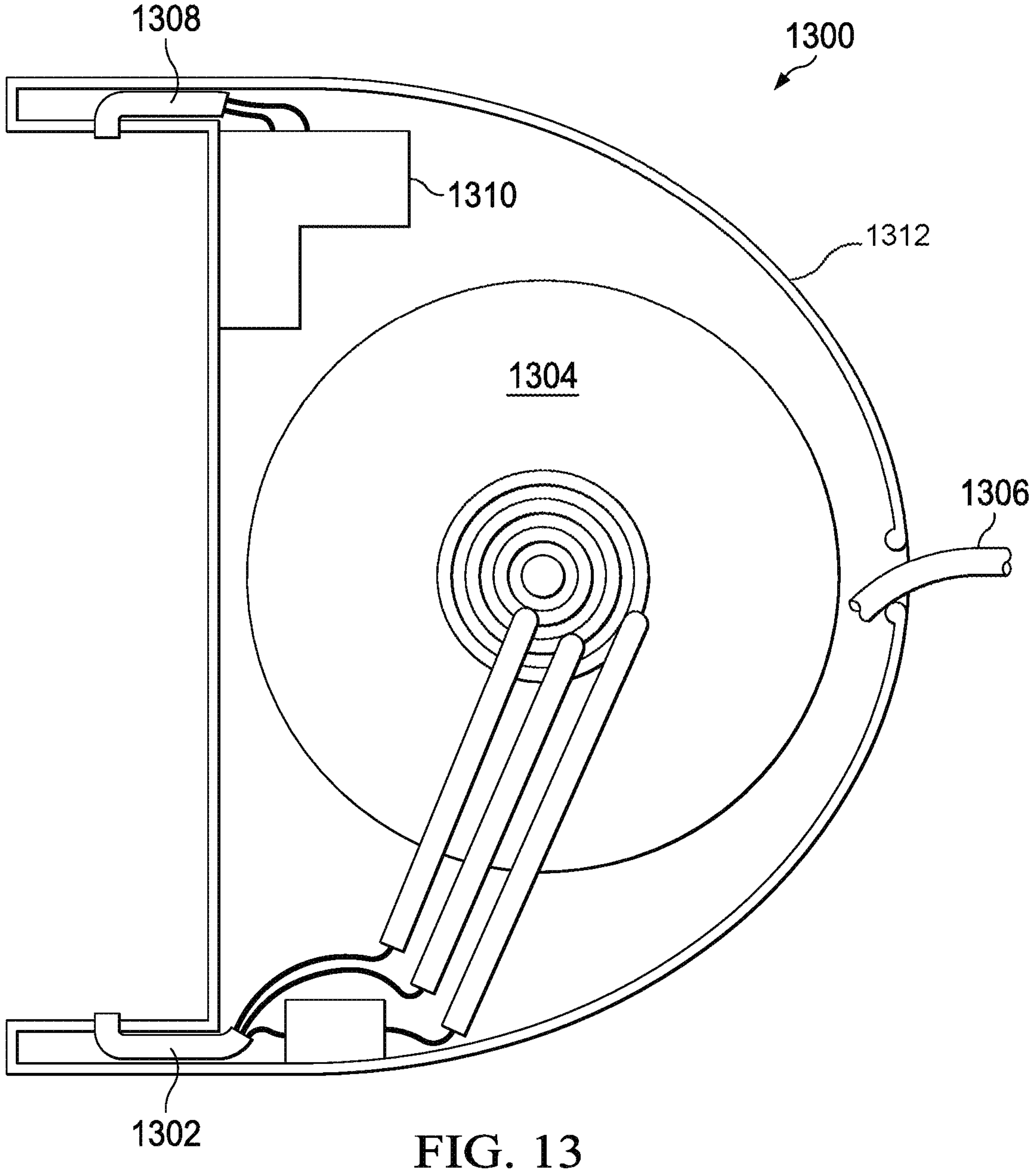
FIG. 13 is an illustration of an illustrative drawing of an electrical conduit reel system of a relocatable/extendable power adapter.
Figure 14A:
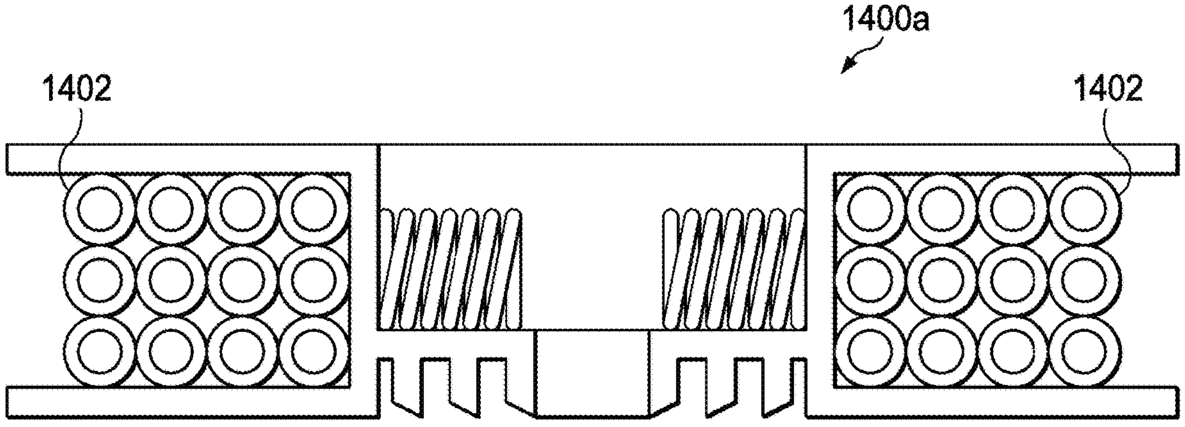
FIGS. 14A-14C are illustrations of an illustrative drawing of an electrical conduit reel system of a relocatable/extendable power adapter.
Figure 14B:
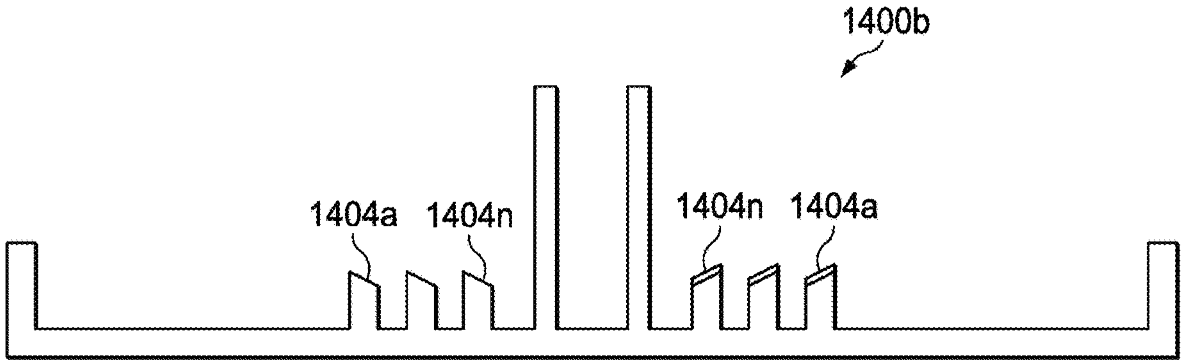
Figure 14C:
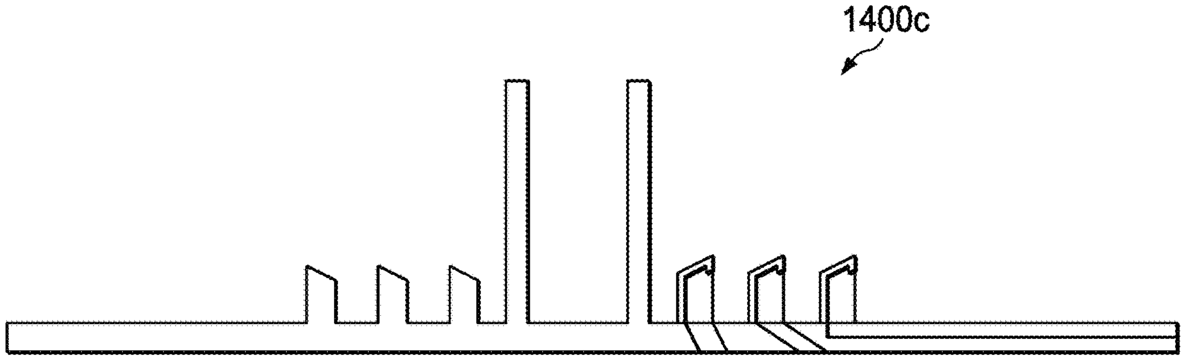
Figure 15:
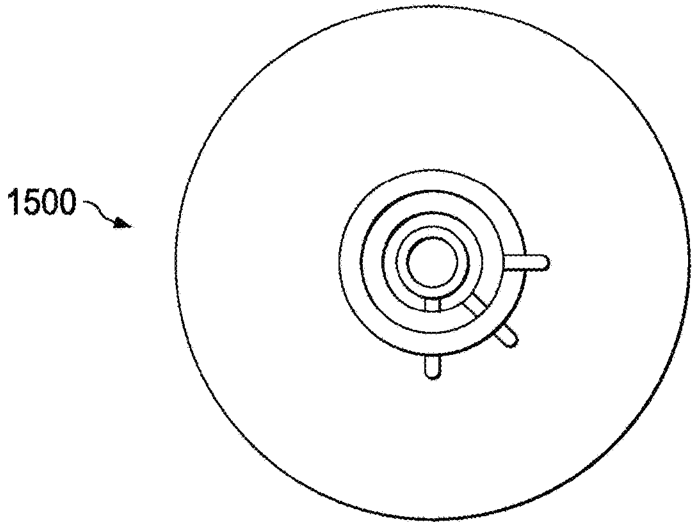
FIG. 15 is an illustration of an illustrative drawing of an electrical conduit reel system of a relocatable/extendable power adapter.
Figure 16A:
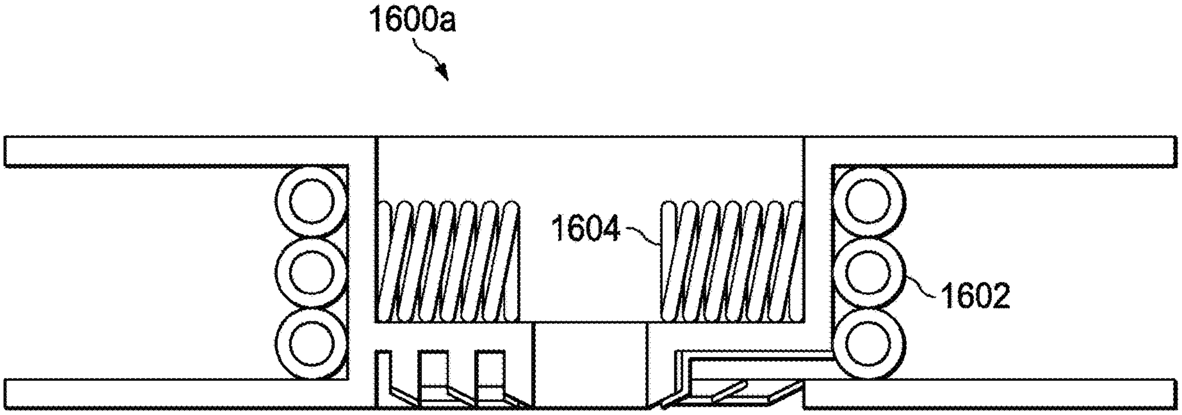
FIGS. 16A and 16B are illustrations of an illustrative drawing of an electrical conduit reel system of a relocatable/extendable power adapter.
Figure 16B:
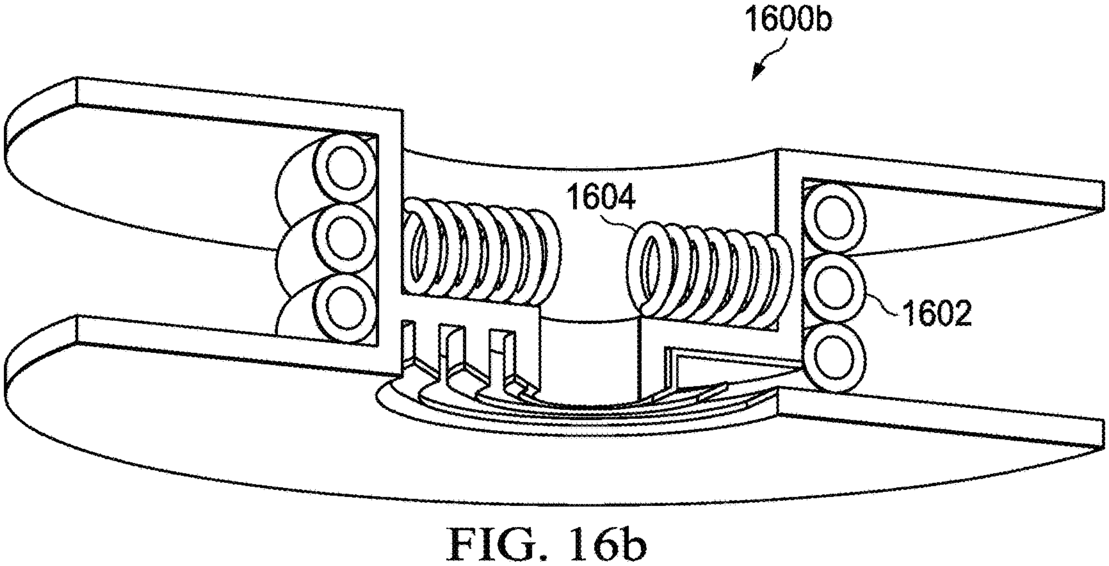
Figure 17A:
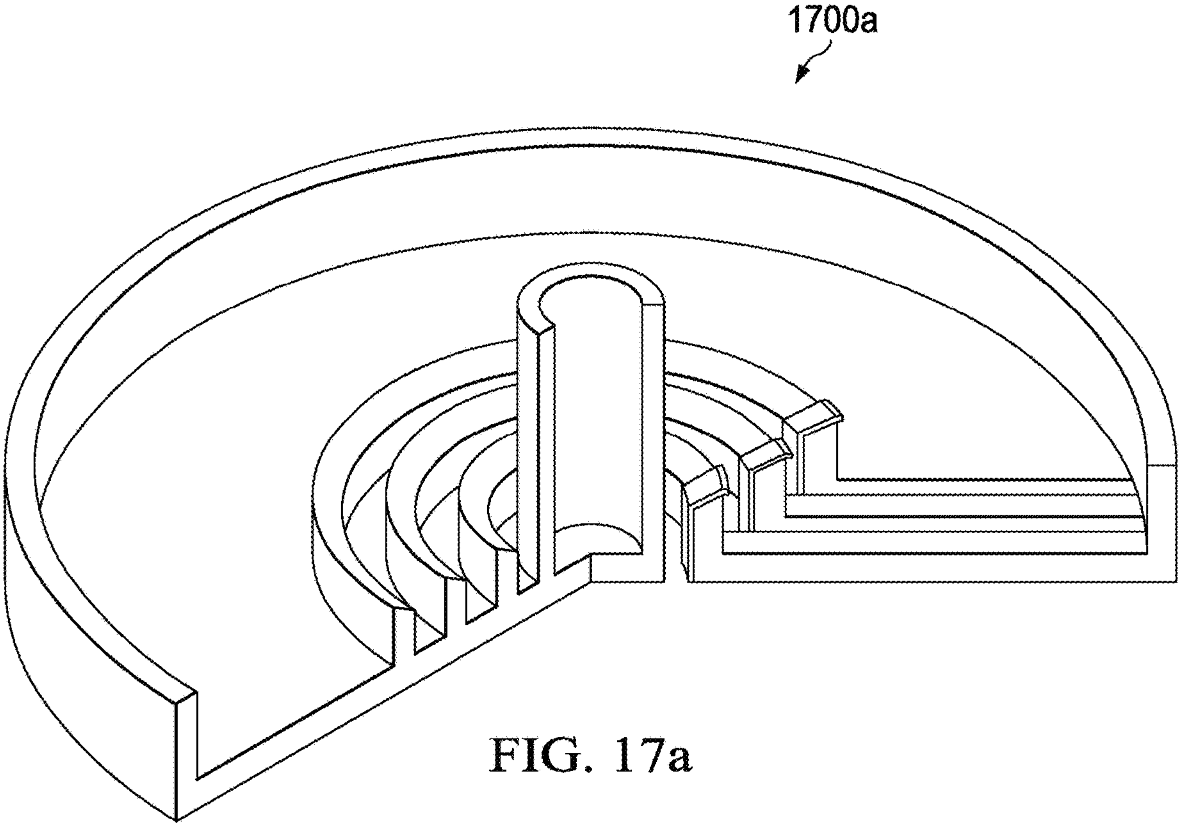
FIGS. 17A-17C are illustrations of an illustrative drawing of an electrical conduit reel system of a relocatable/extendable power adapter.
Figure 17B:
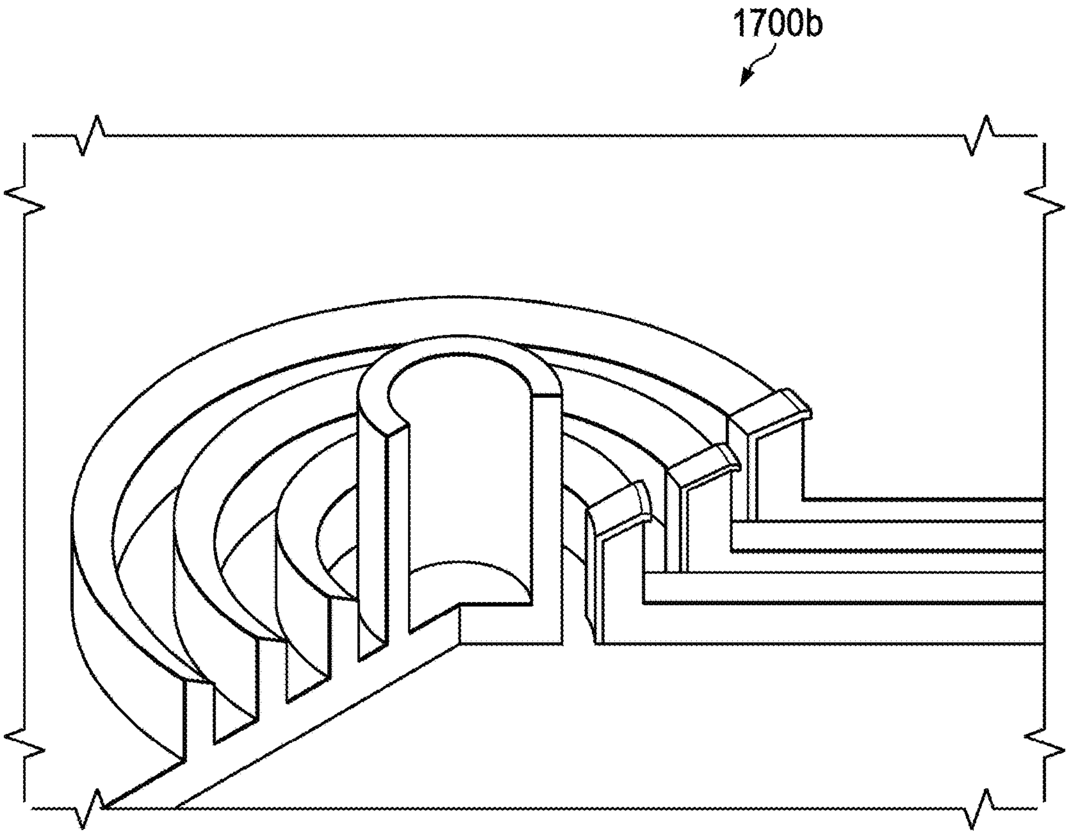
Figure 17C:
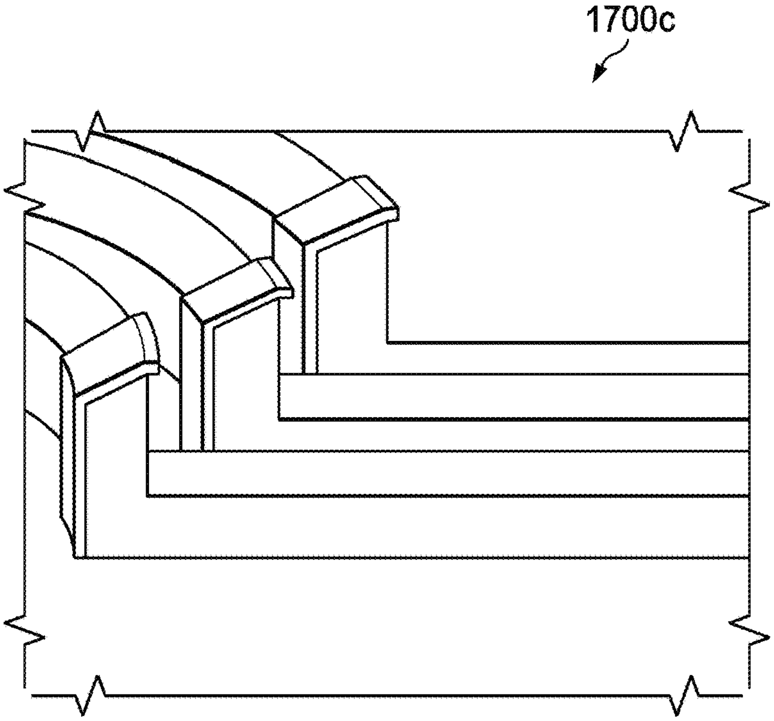

With regard to FIGS. 12A and 12B, illustrations of an illustrative drawing of a connecting mechanism 1200*a* and 1200*b* (collectively 1200) of an extended portion of a relocatable/extendable power adapter are shown. The extended portion may include a rotatable member 1202 such as the rotatable member 1108 described hereinabove with regard to FIG. 11. The rotatable member 1202 may be enabled to rotate independently of a connection status of the extended portion.

In one embodiment, the extended portion may include at least one opening 1204*a*-1204*n* (collectively 1204) this is configured to allow a connector, such as a screw, to pass through and connect directly to a wall. In one embodiment, a connecting mechanism, such as the connecting mechanism 800 of FIG. 8 described hereinabove, may include at least one opening 1206*a*-1206*n* (collectively 1206) for a connecting device or connector, such as a screw, to pass through to mount the connecting mechanism to the wall. The connecting mechanism may be configured to hold the extension unit in place. In one embodiment, the extension unit may be slid into the connecting mechanism.

With regard to FIGS. 13-17C, illustrations of an illustrative drawing of an electrical conduit reel system 1300, 1400*a*-1400*c*, 1600*a* and 1600*b*, 1700*a*-1700*c* (collectively 1300) of an extension unit of a relocatable/extendable power adapter are shown. In one embodiment, the electrical conduit reel system 1300 may include an electrical conductor 1302, 1402, 1602 to supply power to electrical outlets of the extension unit. In one embodiment, the electrical conduit reel system 1300 may include an alternating current to direct current converter 1310 configured to supply power and/or communications to a USB port on the extension unit by a USB cord 1308.

The electrical conduit reel system 1300 may include an inertial reel 1304, 1500 configured to circularly support an electrical conductor 1306 and enable the electrical conductor 1306 to unravel from a first state to a second state in response to the extension unit being pulled away from a base wall mounted power adapter. The electrical conductor 1306 may be electrically coupled to the extension unit on a first end and to the base wall mounted power adapter on a second end opposite the first end. In one embodiment, the electrical conduit reel system 1300 may also include an inertial reel spring 1604 that is configured to enable the inertial reel 1304, 1500 to unravel. In one embodiment, the electrical conductor 1306 may be configured to ravel into the first state using at least one track system 1404*a*-1404*n* (collectively 1404).

A method of manufacturing a wall mounted power adapter may include forming a first housing unit and a second housing unit, inserting an electrical conduit reel into the second housing unit, electrically coupling a first end of the electrical conduit reel to the first housing and electrically coupling a second end of the electrical conduit reel to the second housing, and recessing a portion of the second housing unit configured to receive a connecting mechanism for connecting the second housing unit to wall.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The previous description is of a preferred embodiment for implementing the invention, and the scope of the invention should not necessarily be limited by this description. The scope of the present invention is instead defined by the following claims.

What is claimed:

1. A power adapter kit, comprising:

a base wall mounted power adapter configured to (i) be plugged into a wall power outlet using a first electrical connector including a plurality of prongs and (ii) include at least one second electrical connector for releasably receiving one or more third electrical connectors, the one or more third electrical connectors not being part of the wall power outlet;

at least one extension adapter unit electrically coupled to said base wall mounted power adapter and configured to be extended away from the wall power outlet, said at least one extension adapter unit including an electrical conduit reel on which an electrical conductor is coiled and is configured to unravel in response to said at least one extension adapter unit being extended; and at least one connecting mechanism configured to be mounted to a wall and engage a corresponding at least one extension adapter unit, thereby supporting the corresponding at least one extension adapter unit by the wall.

2. The power adapter kit according to claim 1, wherein the electrical conduit reel is coupled to the at least one extension adapter unit on a first end and coupled to the base wall mounted power adapter on a second end opposite the first end.

3. The power adapter kit according to claim 1, wherein the electrical conduit reel is disposed within a housing of the at least one extension adapter unit in a coiled state.

4. The power adapter kit according to claim 1, wherein the at least one connecting mechanism includes a base that defines openings through which connecting devices extend to secure the at least one connecting mechanism to the wall, wherein the openings are disposed symmetrically about an axis that extends through the at least one extension adapter unit and, when the at least one extension adapter unit is mounted to the wall with the electrical conductor of the electrical conduit reel linearly extended between the at least one extension adapter unit and the base wall mounted power adapter, are vertically aligned with one another.

5. The power adapter kit according to claim 4, further comprising the connecting devices configured to secure the at least one connecting mechanism to the wall.

6. The power adapter kit according to claim 1, wherein the at least one connecting mechanism defines a bracket that engages a housing of the at least one extension adapter unit, thereby releasably connecting the at least one connecting mechanism and the at least one extension adapter unit.

7. The power adapter kit according to claim 1, wherein the at least one connecting mechanism includes a curved shape that corresponds with a curved shape of the at least one extension adapter unit.

8. The power adapter kit according to claim 7, wherein the at least one connecting mechanism includes a base and wall segments that include a space through which the electrical conductor of the electrical conduit reel extends therebetween.

9. The power adapter kit according to claim 1, wherein the at least one extension adapter unit includes at least one of an electrical socket, an Ethernet port, and a universal serial bus port.

10. The power adapter kit according to claim 9, wherein the Ethernet port is configured to provide power.

11. The power adapter kit according to claim 8, wherein the wall segments of the at least one connecting mechanism extend from the base to define the space as a slot such that the electrical conductor of the electrical conduit reel enters the slot orthogonally when the at least one extension adapter unit is mounted to the at least one connecting mechanism.

12. The power adapter kit according to claim 11, wherein the wall segments include a pair of opposing wall segments that engage side walls of the at least one extension adapter unit, the pair of the opposing wall segments being perpendicular to the wall when the at least one connecting mechanism is connected to the wall.

13. The power adapter kit according to claim 12, wherein the opposing wall segments further define retention portions that resist the at least one extension adapter unit from being disengaged from the at least one connecting mechanism perpendicularly from the wall.

14. The power adapter kit according to claim 1, wherein the at least one second electrical connector includes at least one receptacle for releasably receiving the one or more third electrical connectors.

15. The power adapter kit according to claim 1, wherein the at least one connecting mechanism further enabling the electrical conductor of the corresponding at least one extension adapter unit to linearly extend from the base wall mounted power adapter to the corresponding at least one extension adapter unit.

16. The power adapter kit according to claim 1, wherein the at least one third electrical connectors includes at least one male connector configured to be connected to the at least one second electrical connector including at least one corresponding receptacle.

17. The power adapter kit according to claim 1, wherein the at least one second electrical connector is configured to electrically and physically engage the one or more third electrical connectors attached to the electrical conductor of the electrical conduit reel, thereby providing electrical power to the at least one extension adapter unit.

* * * * *